United States Patent [19]

Stephenson

[11] Patent Number: 5,732,789
[45] Date of Patent: Mar. 31, 1998

[54] ARTICULATED VEHICLE STEERING WITH BOGIE FEEDBACK

[75] Inventor: Dwight B. Stephenson, Burnsville, Minn.

[73] Assignee: Eaton Corporation, Cleveland, Ohio

[21] Appl. No.: 668,809

[22] Filed: Jun. 24, 1996

[51] Int. Cl.[6] .................................................. B62D 5/09
[52] U.S. Cl. .......................... 180/418; 180/432; 180/139
[58] Field of Search ......................... 180/139, 417, 180/418, 442, 449, 432, 444, 134

[56] References Cited

U.S. PATENT DOCUMENTS

| | | | |
|---|---|---|---|
| 3,631,937 | 1/1972 | Joyce | 189/79.2 B |
| 4,071,108 | 1/1978 | Iida | 180/139 |
| 4,802,545 | 2/1989 | Nystuen et al. | 180/135 |
| 5,193,637 | 3/1993 | Lindblom | 180/418 |
| 5,520,262 | 5/1996 | Marcott | 180/418 |

*Primary Examiner*—Jesus D. Sotelo
*Attorney, Agent, or Firm*—L. J. Kasper

[57] ABSTRACT

A steering system for an articulated vehicle (11) including steering cylinders (19, 21) wherein the steering system includes a steering control valve (31) having a housing (33) fixed to a rear bogie portion (15). The steering control valve (31) includes a spool valve (49) receiving steering input and a follow up sleeve valve (51) which receives feedback representative of a change in the articulation angle of the front bogie portion (13) by means of a linkage arrangement (123, 117, 63). Either the follow up movement of the sleeve relative to the spool, to reduce main system flow, or the follow up of the sleeve relative to the housing, to reduce the load signal, is used as a way of cushioning the steering, as the front and rear bogie portions (13, 15) approach maximum articulation.

16 Claims, 7 Drawing Sheets

ARTICULATED VEHICLE STEERING WITH BOGIE FEEDBACK

BACKGROUND OF THE DISCLOSURE

This invention relates to vehicle steering systems, and in particular, to hydrostatic power steering systems for articulated vehicles, such as those used for construction applications.

In a conventional hydrostatic power steering system for an articulated vehicle, having forward and rearward bogie portions pivotally coupled to each other, there is a pair of steering cylinders arranged on opposite sides of the front bogie. The cylinders typically have their piston rods coupled to the rear bogie portion, so that extending one cylinder while retracting the other cylinder results in articulation of the two bogie portions, and steering of the vehicle.

In order to minimize operator fatigue, it has been recognized by those skilled in the art as being desirable to simplify the control of the vehicle by integrating various control functions into the steering wheel. For example, it would be desirable to have both the transmission shift lever and the loader control valve lever mounted on the steering wheel. However, in order to combine such functions with the steering function, it is necessary that the amount of steering wheel rotation, lock-to-lock, be reduced to, for example, 90 degrees on either side of the centered (neutral) position or, preferably, even less than 90 degrees. In developing the present invention, an attempt has been made to achieve full steering function while turning the wheel about 55 degrees on either side of the neutral position, to facilitate the use, by the vehicle operator, of the other control functions at any time within the full range of steering angles.

A typical, prior art hydrostatic power steering system, including the fluid controller and valving therefor is illustrated in U.S. Pat. No. 4,620,416, assigned to the assignee of the present invention and incorporated herein by reference. In the conventional fluid controller, for use in steering systems of the type to which this invention relates, there is a housing which defines various fluid ports, rotatable valving disposed within the housing, and a fluid meter, through which metered fluid flows to the steering cylinder, and an arrangement for imparting follow-up movement to the rotating valving in response to the flow through the fluid meter.

As will be understood by those skilled in the art, it is not feasible to use a conventional fluid controller, of the type described above, and including fluid meter feedback to the valving, in a steering system designed to have relatively low operator input to the steering wheel (i.e., plus and minus 90 degrees or less). The required continuous rotation of the fluid meter, as well as the "slip" typically associated with the fluid meter, requires greater steering input in order to operate properly.

In the conventional fluid controller, one function of the fluid meter (which is typically a gerotor gear set), is to serve as a hand pump, and generate pressurized fluid in response to the rotation of the steering wheel, thereby providing "manual steering", in the event of a loss of hydraulic pressure to the controller. However, on most articulated vehicles, the size and mass of the vehicle is such that manual steering of the type described above is not physically possible, thus eliminating this particular reason for needing the fluid meter.

SUMMARY OF THE INVENTION

Accordingly, it is an object of the present invention to provide a hydrostatic power steering system, and fluid controller therefor, for use on an articulated vehicle, wherein the system will operate satisfactorily with relatively low steering input.

It is a more specific object of the present invention to provide an improved steering system and fluid controller which does not require conventional fluid meter feedback to the controller valving, but which still has a form of feedback to the valving for smoothness of operation and roadability of the steering system.

It is a related object of the present invention to provide such an improved hydrostatic power steering system for an articulated vehicle which is able to eliminate the lateral "jerk" which typically occurs when steering the vehicle into the frame stops.

The above and other objects of the invention are accomplished by the provision of a steering system for an articulated vehicle including a rear bogie portion defining a first axis, and a front bogie portion defining a second axis, the first and second axes defining an articulation angle. A fluid pressure operated means has one portion connected to the rear bogie portion and another portion connected to the front bogie portion, and is operable, in response to the presence of pressurized fluid, to change the articulation angle. The steering system comprises a source of pressurized fluid and a steering control valve assembly including a housing defining a fluid inlet port in fluid communication with the source of pressurized fluid, and a first control fluid port in fluid communication with the fluid pressure operated means. The steering control valve assembly further comprises a primary valve member adapted to receive steering input, and a follow up valve member disposed between the primary valve member and the housing. The primary and follow up valve members cooperate to define an operating position, relatively displaced from a neutral position, in which the valve members define a main flow path providing fluid communication between the fluid inlet port and the first control fluid port.

The improved steering system is characterized by the housing of the steering control valve assembly being fixed relative to one of the rear and front bogie portions, and feedback means operable to transmit a motion, representative of a change in the articulation angle, as a follow up movement to the follow up valve member.

DESCRIPTION OF THE PREFERRED EMBODIMENT

Figure 1:
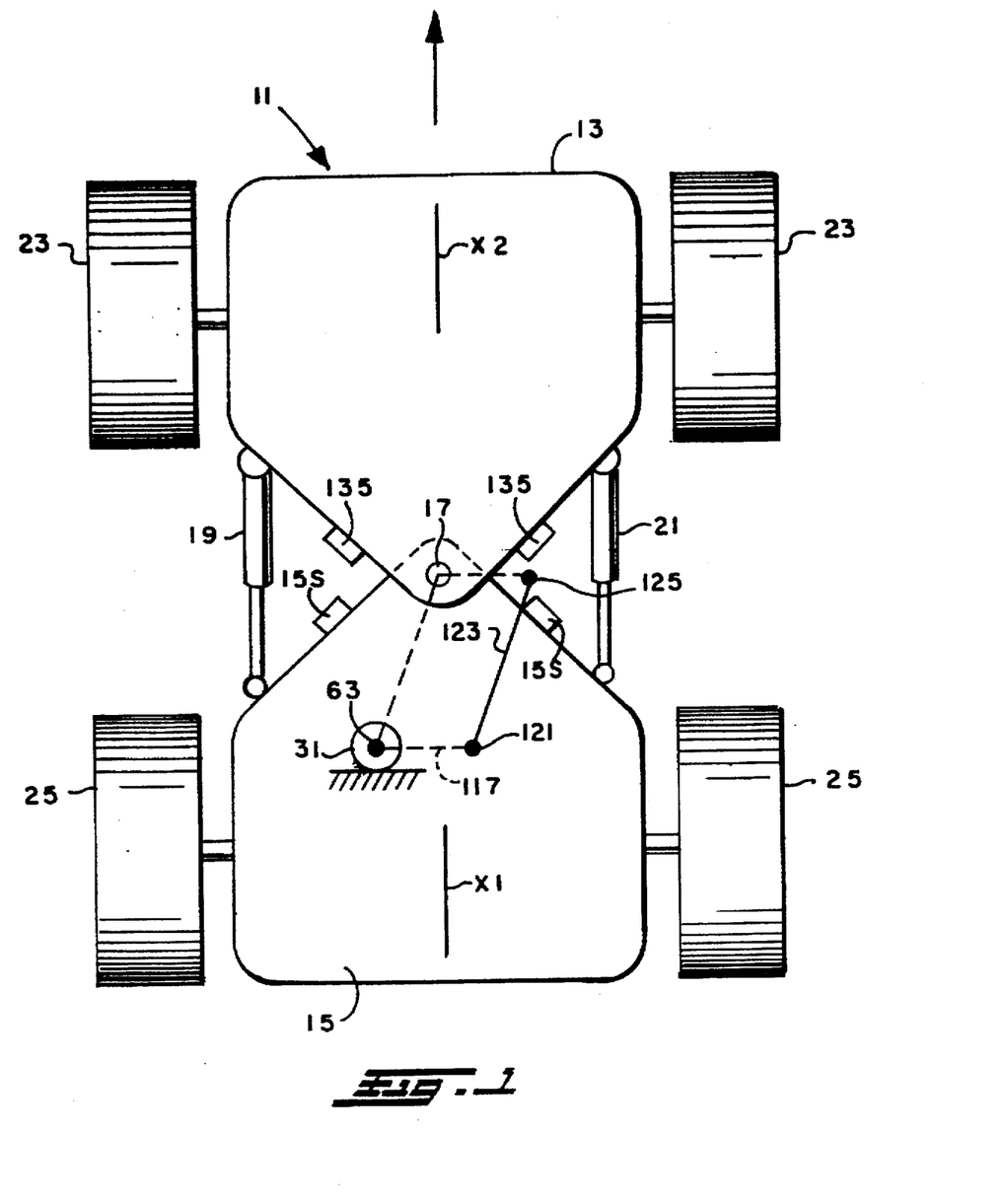
FIG. 1 is a schematic representation of an articulated vehicle, including the hydrostatic power steering system of the present invention.

Referring now to the drawings, which are not intended to limit the invention, FIG. 1 illustrates an articulated vehicle, generally designated 11, including a front bogie portion 13 and a rear bogie portion 15. The front and rear bogie portions 13 and 15 are pivotally connected to each other by a vertical pivot pin 17. The rear bogie portion 15 defines an axis X1, while the front bogie portion 13 defines an axis X2, and the normal direction (forward) of vehicle travel would be as indicated by the arrow in FIG. 1.

Figure 2:
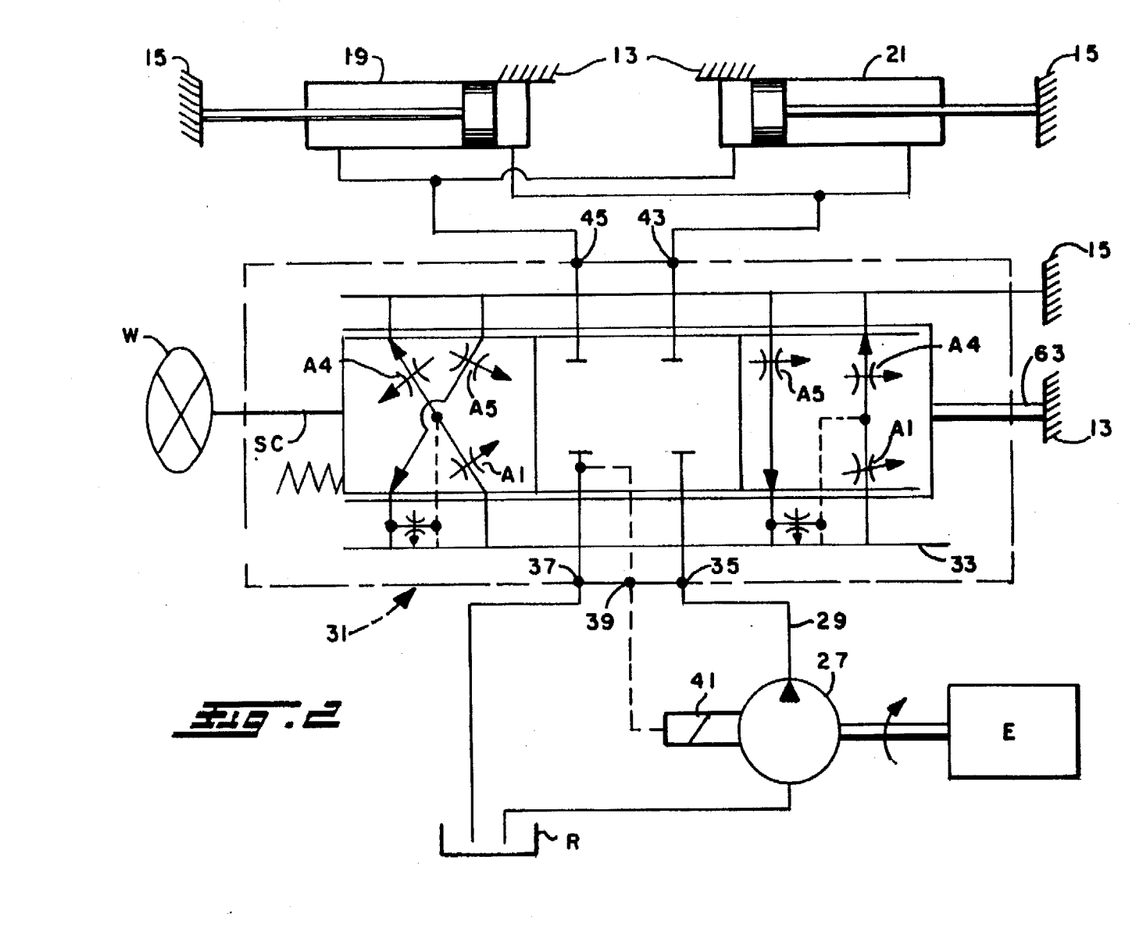
FIG. 2 is a hydraulic schematic of the hydrostatic power steering system, including the fluid controller made in accordance with one aspect of the present invention.

The hydrostatic power steering system of the present invention includes a pair of steering cylinders 19 and 21, each of which has, by way of example only, its head end pivotally anchored to the front bogie portion 13, and its rod end pivotally anchored to the rear bogie portion 15 in a manner which is well known to those skilled in the art, and which is shown schematically in FIG. 2. The front bogie portion 13 includes a pair of wheels 23, while the rear bogie portion 15 includes a pair of wheels 25. In addition, the front bogie portion 13 includes a pair of members 13S, while the rear bogie portion 15 includes a pair of members 15S, each pair of the members 13S and 15S which are on the same side of the vehicle comprising "frame stops", the function of which is to limit the extent of articulation of the vehicle, in a well known manner.

Referring now primarily to FIG. 2, the hydrostatic power steering system of the invention will be described generally. Mounted on the articulated vehicle 11, and typically, on the rear bogie portion 15, is a vehicle engine, generally designated E, which provides drive torque to a pump 27, illustrated herein schematically as being a load sensing pump. The pump 27 is the source of pressurized fluid for the hydrostatic power steering system of the present invention. Pressurized fluid from the pump 27 is communicated by means of a conduit 29 to a fluid controller, generally designated 31, the function of the fluid controller 31 being to control the flow of pressurized fluid to the steering cylinders 19 and 21, in response to a steering input, which is typically by means of a vehicle steering wheel W and a steering column SC.

Figure 3:
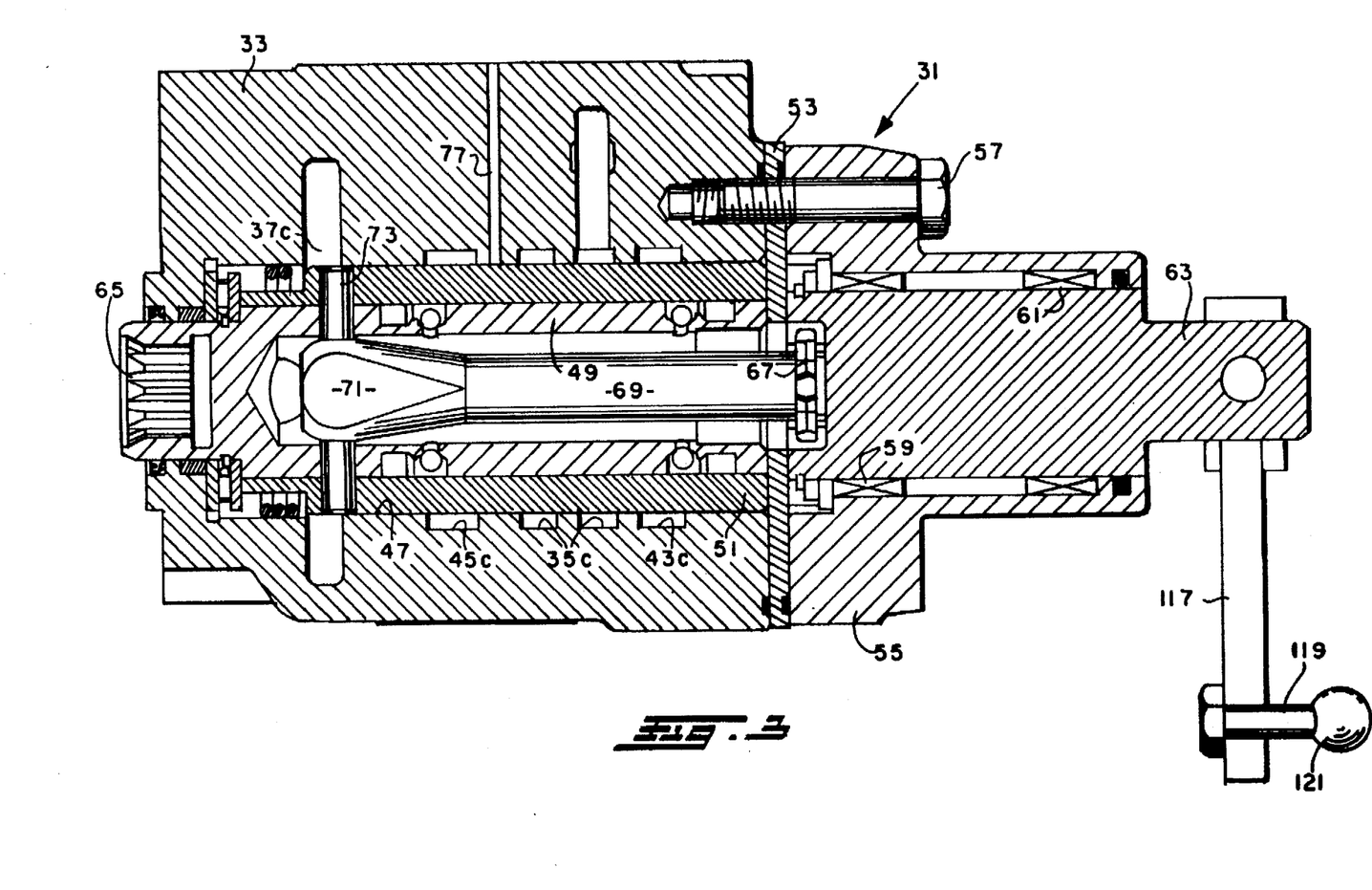
FIG. 3 is an axial cross-section of the fluid controller of the present invention, shown schematically in FIG. 2.

Referring now to FIG. 3, in conjunction with FIG. 2, the fluid controller 31 includes a housing 33 which defines an inlet port 35 connected to the conduit 29, and an outlet port 37, which is in communication with a system reservoir R. The housing 33 also defines a load sensing port 39 which is in communication with a displacement control 41 of the fluid pump 27, such that the pump 27 is both pressure and flow compensated. Finally, the controller housing 33 defines a control fluid port 43, which is in communication with the head end of the steering cylinder 19 and the rod end of the steering cylinder 21, and the housing 33 further defines a control fluid port 45 which is in fluid communication with the rod end of the cylinder 19 and the head end of the cylinder 21. It is believed that the reason for the above-described arrangement is well known to those skilled in the art of articulated vehicle steering.

Referring still to FIG. 3, the fluid controller 31 will be described in some detail. The housing 33 defines a valve bore 47, and rotatably disposed therein is a valving arrangement comprising a primary, rotatable valve member 49 (referred to hereinafter as the "spool"), and a cooperating, relatively rotatable follow-up valve member 51 (referred to hereinafter as the "sleeve").

The fluid controller 31 comprises several sections, including, in addition to the valve housing 33, a wear plate 53, and a shaft support housing 55. These sections are held together in tight sealing engagement by means of a plurality of bolts 57 (only one of which is shown in FIG. 3) which are in threaded engagement with the valve housing 33. Disposed within the shaft support housing 55, and rotatably disposed therein by means of bearing sets 59 and 61, is a shaft member 63, the function of which will be described subsequently.

At the forward end of the spool 49 is a portion having a reduced diameter, and defining a set of internal splines 65, which provide for a direct mechanical connection between the spool 49 and the vehicle steering wheel W. The spool 49 and sleeve 51 will be described in greater detail subsequently, but it should be noted that in accordance with one aspect of the present invention, the valve housing 33, the sleeve 51, and the spool 49 comprise three separate fluid metering members.

The left end (in FIG. 3) of the shaft member 63 defines a set of internal splines, and in engagement therewith is a set of external splines 67 formed at the rearward end of a drive shaft 69. The drive shaft 69 has a bifurcated forward end 71 permitting driving connection between the shaft 69 and the sleeve 51, by means of a drive pin 73. The ends of the pin 73 pass through a pair of oversized pin openings 75 (see FIG. 4), defined by the spool 49, and are received in relatively close-fitting openings 103 in the sleeve 51.

Referring still to FIG. 3, the valve bore 47 of the housing 33 defines a plurality of annular fluid chambers surrounding the sleeve 51, to provide fluid communication between the various ports and the outer surface of the sleeve 51. A pair of annular chambers 35c receive pressurized fluid from the inlet port 35, while an annular chamber 37c communicates return fluid to the return port 37. An annular chamber 43c provides communication to or from the control fluid port 43, while an annular chamber 45c provides fluid communication to or from the control fluid port 45. In addition, the valve housing 33 defines a load sensing port 77 which comprises a single drilled bore communicating between the valve bore 47 and the external load sensing port 39 (see FIG. 2).

Figure 4:
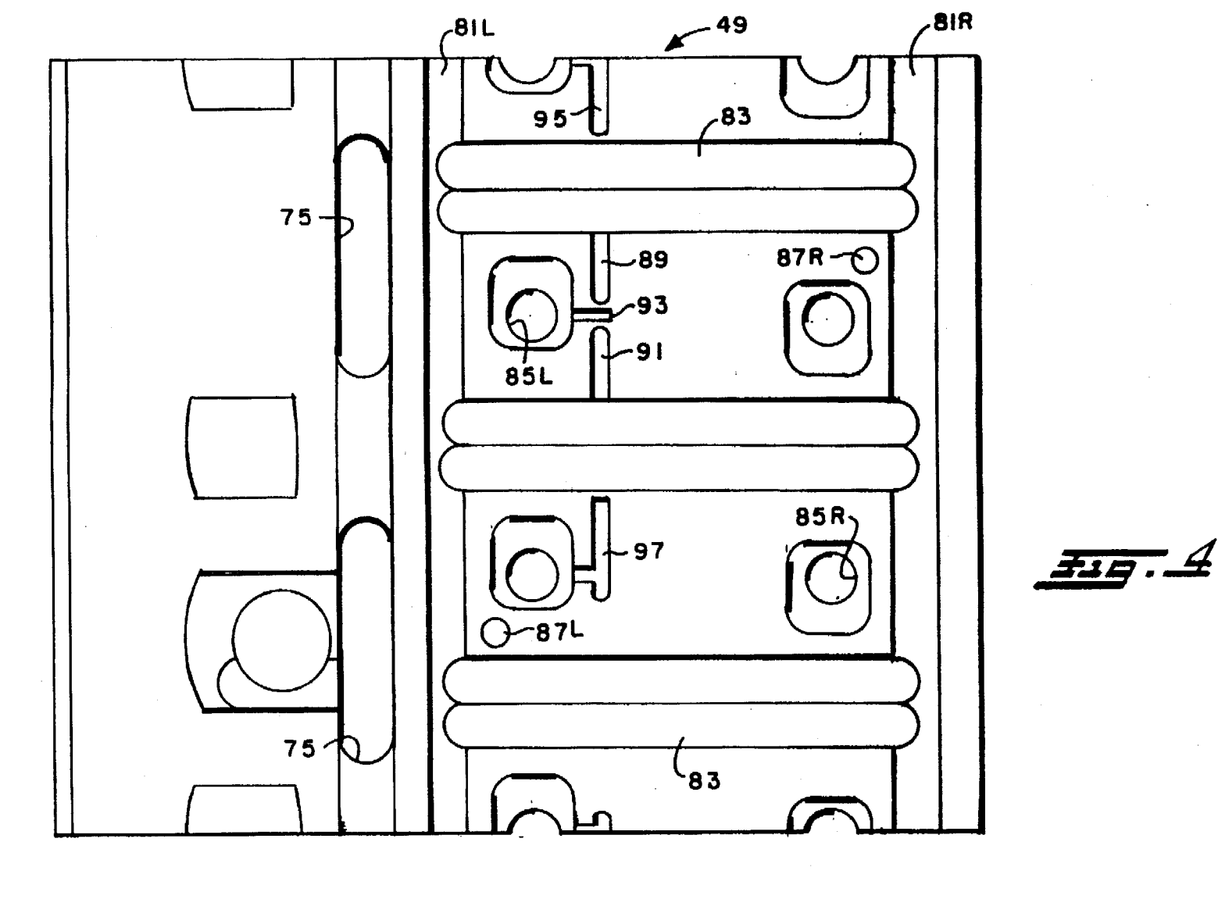
FIG. 4 is a flat, layout view of the primary valve member of the fluid controller shown in FIG. 3, but on a slightly larger scale.

Referring now primarily to FIG. 4, the spool valve 49 will be described. In a manner which is now well known in the fluid controller art, the various elements defined by the spool 49 and the sleeve 51 are generally symmetrical about an imaginary central plane which, in the case of the present invention, is perpendicular to the axis of the drive shaft 69 and is disposed between the two annular chambers 35c. Elements which are disposed on the left side (in FIGS. 4 and 5) of this imaginary plane will bear a reference numeral followed by "L", whereas elements on the right side of the imaginary plane will bear the same reference numeral followed by an "R".

The spool valve 49 includes a pair of annular grooves 81L and 81R, which are interconnected by three pairs of axially extending slots 83, the primary function of the annular grooves 81L and 81R being to insure equal pressures in all of the axial slots 83, and to provide for radial balancing of the spool and sleeve, as is now well known. Disposed circumferentially between adjacent pairs of the slots 83 are tank ports 85L and 85R. Each of the tank ports 85L and 85R has, on the surface of the spool valve 49, a configuration which may be referred to as a "rounded square", but also includes a circular portion which is open through to the interior of the spool valve 49.

Disposed adjacent one of the tank ports 85L is a radial bore and seat in which is disposed an anti-cavitation check ball 87L, and similarly, disposed adjacent one of the tank ports 85R is a radial bore and seat in which is disposed an anti-cavitation check ball 87R. The function of these check balls will be described subsequently. In open communication with two of the adjacent axial slots 83 are circumferentially extending slots 89 and 91, and disposed between the slots 89 and 91, and in communication with the adjacent tank port 85L is an axial slot 93. Each of the other tank ports 85L has in communication therewith a circumferentially extending slot 95 or 97. The function of all of the above-referenced slots will be described subsequently. It should be noted that in FIG. 8, the axial slot 93 and the passages connecting the slots 95 and 97 to the tank port 85L (all of which are merely axial slots formed on the surface of the spool 49) are illustrated schematically as passing through to the interior of the spool 49, which they do indirectly by means of the tank ports 85L rather than directly as illustrated schematically in FIG. 8.

Figure 5:
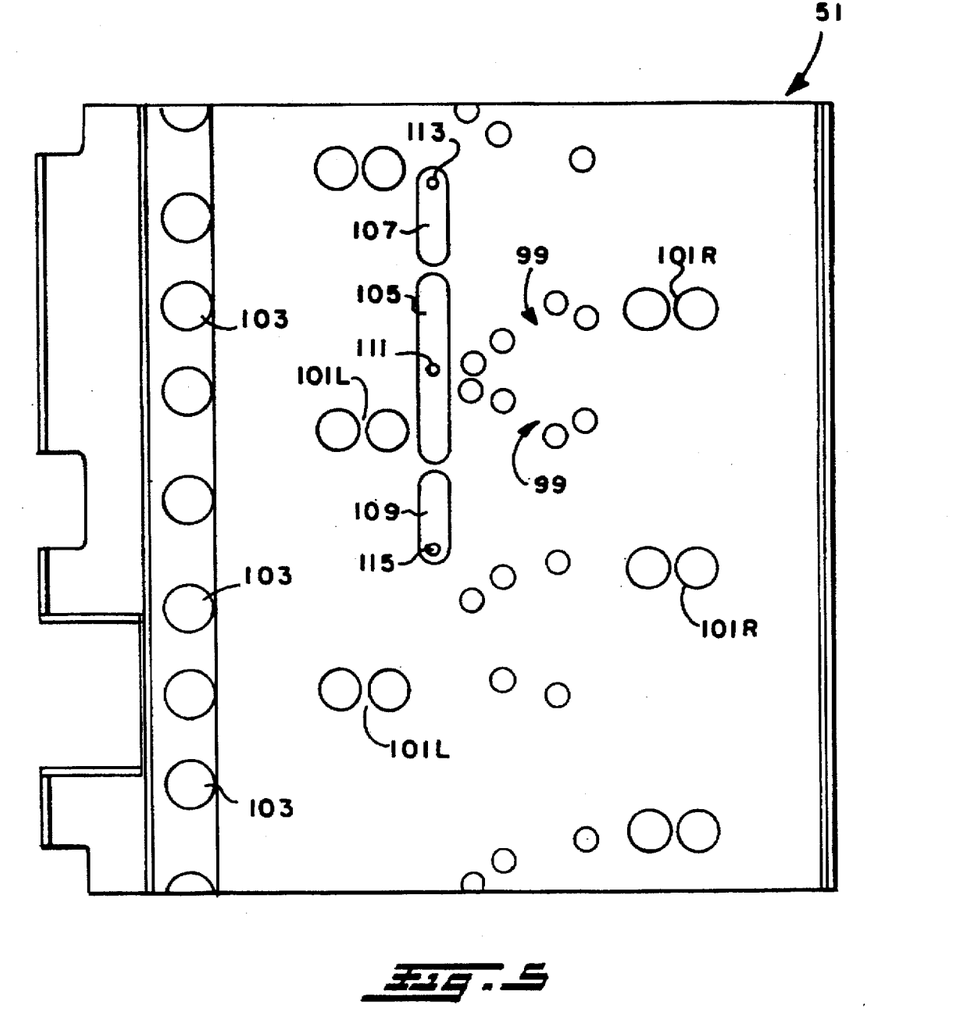
FIG. 5 is a flat, layout view of the follow up valve member of the fluid controller shown in FIG. 3, on the same scale as FIG. 4.

Referring now primarily to FIG. 5, the sleeve valve 51 will be described. Except where noted, all of the features in the sleeve valve 51 comprise radially-oriented bores, communicating between the surface of the spool valve 49 and one of the annular chambers defined by the valve housing 33. In the subject embodiment of the invention, there are two of the annular chambers 35c, both of which are in unrestricted communication with the fluid inlet port 35, such that the two chambers 35c could comprise a single annular chamber, with no effect upon the function of the controller 31.

The sleeve valve 51 defines several groupings of pressure ports, generally designated 99, which will be described in greater detail in connection with FIGS. 6 and 7. The sleeve 51 includes several pairs of operating ports 101L, and several pairs of operating ports 101R. Finally, the sleeve 51 defines a series of tank ports 103, which are axially aligned with the pin openings 75, whereby return fluid (or case drain fluid) within the spool valve 49 flows outward through the openings 75, then through the tank ports 103 (except for the two which receive the opposite ends of the drive pin. 73), and from there return fluid flows to the annular chamber 37c, then through the outlet port 37 to the system reservoir R.

On the surface of the sleeve valve 51, and axially aligned with the slots 89, 91, 95, and 97, are circumferentially-extending slots 105, 107, and 109. Disposed within the slot 105 is a bore 111, and similarly, disposed within the slot 107 is a bore 113 and disposed within the slot 109 is a bore 115. Each of the bores 111, 113, and 115 extends radially through the sleeve valve 51 to provide communication between the exterior surface of the spool valve 49 and the respective slot 105, 107, or 109.

Figure 6:
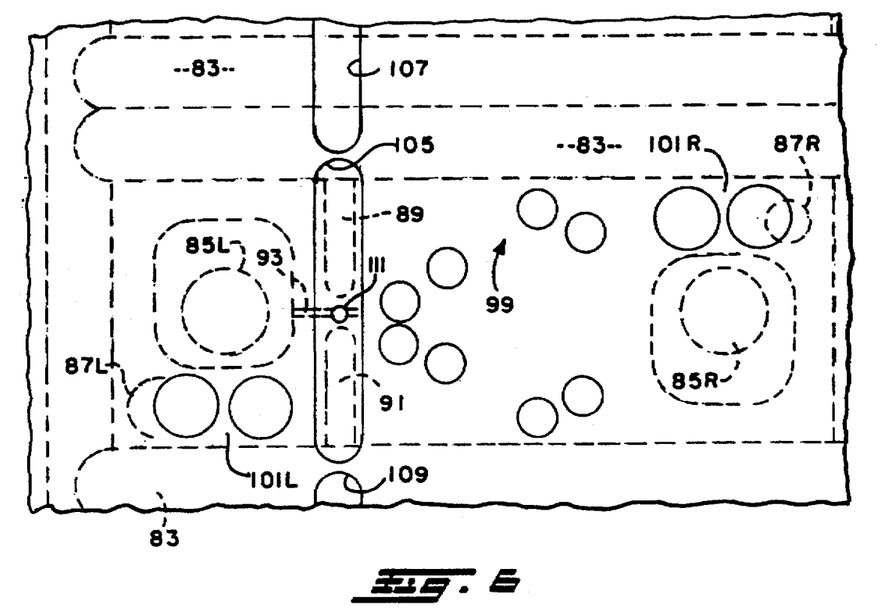
FIGS. 6 and 7 are enlarged, fragmentary, overlay views of the primary and follow up valve members in their neutral and displaced positions, respectively.

With the spool 49 and sleeve 51 in their neutral position, relative to each other, as shown in FIG. 6, the pressure ports 99 are blocked from fluid communication with the axial slots 83, as are both the operating ports 101L and 101R. However, the load sensing port 77 is aligned with the bore 111 which, in turn, is in communication with the axial slot 93, such that the load signal communicated back to the displacement control 41 is drained to tank, to provide a minimum standby pressure at the outlet of the pump 27. At the same time, the bore 113 communicates the slot 107 to the slot 95, and therefore, to tank, while the bore 115 communicates the slot 109 to the slot 97, and therefore, to tank also. Finally, the anticavitation check balls 87L and 87R are in fluid communication with the operating ports 101L and 101R, respectively, such that, if there is an external load imposed upon the steering cylinders 19 and 21, fluid will be drawn from the interior of the spool 49, past whichever check ball 87L or 87R is connected to the expanding cylinder chambers. This arrangement is necessary to keep the cylinders full of fluid, and prevent cavitation, otherwise there may subsequently be a loss of steering capability.

Figure 7:
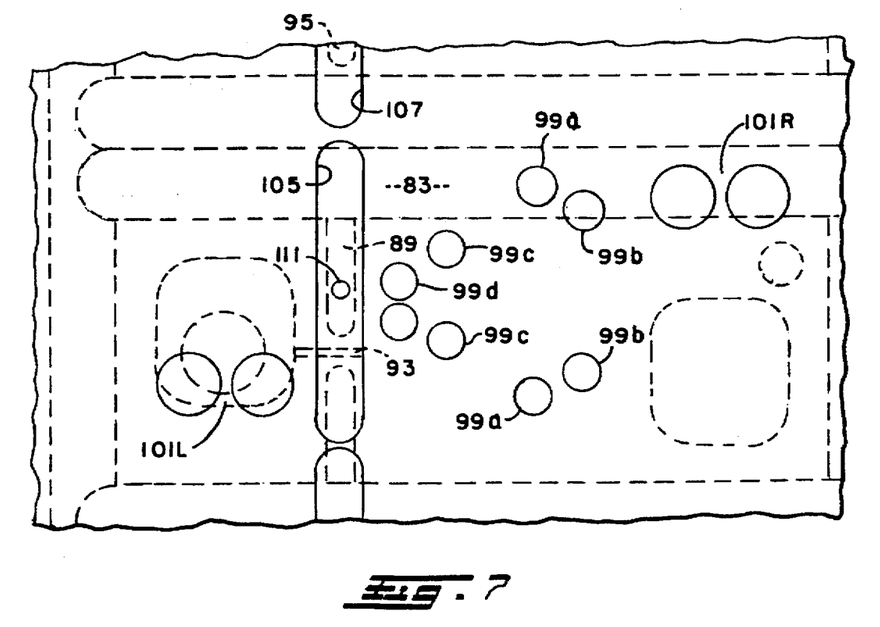

Referring now primarily to FIG. 7, the flow path through the spool 49 and sleeve 51 will be described in connection with a right turn condition in which pressurized fluid is communicated to the control port 43, thus extending the cylinder 19 and retracting the cylinder 21. As soon as the spool is rotated clockwise, as viewed by the vehicle operator, for a right turn, the bore 111 is moved out of fluid communication with the axial slot 93, such that the load sensing port 39 is no longer drained to tank. Instead, the bore 111 is now in communication with the circumferential slot 89. It should be noted that in FIG. 7 only, the pressure ports 99 will bear individual reference numerals, representative of the order of fluid communication with the axial slot 83. Therefore, after several degrees of rotation of the spool, relative to the sleeve, the pressure port 99a begins to communicate with the axial slot 83, thus communicating inlet pressure into the slot 83 and the slot 89, such that inlet pressure is now communicated through the bore 111 and the circumferentially-extending slot 105, then through the load sensing port 77 to increase the standby pressure of the pump, as will be discussed in further detail subsequently. The area of overlap of the pressure ports 99 with the axial slots 83 defines a main variable flow control orifice A1 (see FIG. 2). At the same time as the ports 99a begin to communicate with the slots 83, the operating ports 101R also begin to communicate with the slots 83, the area of overlap therebetween comprising a variable flow control orifice A4 (again see FIG. 2).

At about the same time as the A1 and A4 orifices begin to open, the operating ports 101L begin to communicate with the tank ports 85L, the cumulative area of overlap therebetween defining a variable flow control orifice A5 (see FIG. 2). Although not illustrated herein, and not truly essential to the present invention, the fluid controller 31 of the present invention would preferably include a dampening fluid path communicating from the main fluid path, at a location disposed just upstream of the A4 orifice to the main fluid path at a location disposed downstream of the A5 orifice. Such a dampening path is illustrated and described in U.S. Pat. No. 4,781,219, assigned to the assignee of the present invention and incorporated herein by reference.

In accordance with a preferred embodiment of the present invention, the spool 49 and sleeve 51 comprise "wide angle valving" of the type illustrated and described in U.S. Pat. No. 5,080,135, for a "LARGE DEFLECTION ANGLE ROTARY MODULATION STEERING VALE", assigned to the assignee of the present invention and incorporated herein by reference. Thus, in addition to the pressure port 99a there is also a pressure port 99b, which begins to communicate with the slot 83 after several additional degrees of relative rotation between the spool and sleeve. After several additional degrees of displacement, a pressure port 99c will begin to communicate with the axial slots 83 (but is not yet doing so at the displacement shown in FIG. 7). Finally, as the spool and sleeve approach maximum relative displacement, a pressure port 99d will come into fluid communication with the axial slot 83. In the subject embodiment, and by way of example only, the relative rotation of the spool 49 and sleeve 51, at maximum displacement, is at least about 30 degrees, and preferably in the range of about 45 degrees to about 60 degrees. Specific examples of relative spool and sleeve displacements will be given subsequently in connection with the description of FIG. 8 and the "against the stop jerk prevention" feature of the present invention.

It is believed that in the case of a low rotary input fluid controller of the type to which the invention relates, the use of the wide angle valving just described will greatly enhance the smoothness of the steering function, and in addition will improve the roadability of the vehicle, i.e., will keep the steering from being too aggressive (too high a gain rate), which is especially significant when the vehicle is being driven at higher speeds (e.g., on the road, during "transport" mode).

In typical fluid controllers of the type to which the present invention relates, there is a follow up movement transmitted to the sleeve 51 from a fluid meter, in response to the flow of fluid therethrough. However, as was noted in the BACKGROUND OF THE DISCLOSURE, it is not feasible to use a fluid meter to achieve follow up movement on a fluid controller having very low steering input (e.g., less than ninety degrees of steering wheel rotation on either side of the centered position of the wheel). Accordingly, it is one important aspect of the present invention that follow up movement to the sleeve valve 51 be accomplished by means of a mechanical feedback motion which is transmitted to the shaft member 63, and from there is transmitted by means of the drive shaft 69 and the drive pin 73 to the sleeve 51. In accordance with another aspect of the present invention, the feedback movement transmitted to the shaft member 63 is representative of the angle of articulation of the articulated vehicle 11, i.e., the deviation of the axes X1 and X2 from co-linearity.

Referring now primarily to FIGS. 1-3, there is illustrated a preferred embodiment of the means for providing the mechanical feedback to the shaft member 63, and ultimately, to the sleeve valve 51. As is shown schematically in FIG. 1, the fluid controller 31, and specifically, the housing 33 thereof, is fixed relative to the rear bogie 15. In FIG. 1, the controller 31 is illustrated as being transversely offset from the axis X1 simply to illustrate the general case, wherein location on the axis is not required. When installed in the vehicle, the fluid controller 31 would be oriented generally vertically, with the splines 65 extending upwardly toward the steering wheel W, and the shaft member 63 extending downwardly toward the rear bogie 15.

As may best be seen in FIG. 3, attached to the "lower" end of the shaft 63 is a bell crank member 117 (also shown schematically in FIG. 1). At the far end of the bell crank 117 (i.e. away from the shaft 63) is a stud member 119 having attached to its lower end a spherical rod end 121 (also shown schematically in FIG. 1). The rod end 121 may be received within the female portion of a connecting rod, designated 123 and shown only in FIG. 1. The end of the connecting rod 123 opposite the rod end 121 includes another female portion receiving another spherical rod end 125, which is shown schematically in FIG. 1 as being out of contact with the front bogie portion 13, but in reality, is fixed relative to the front bogie 13. Depending upon the particular geometry selected, the spherical rod end 125 may be located either on the front bogie 13, or on a member projecting laterally from the front bogie 13 (thus putting it generally in the position shown schematically in FIG. 1).

The arrangement shown schematically in FIG. 1 of the pivot pin 17, the fluid controller 31, the bell crank 117, the connecting rod 123, and the spherical rod ends 121 and 125, comprises what is typically referred to as a "four bar linkage". Those skilled in the art of four bar linkages will understand from a reading of the present specification that the function of the linkage arrangement of the present invention is to provide feedback movement to the shaft 63 which corresponds to the angle of articulation between the front and rear bogies, i.e., the deviation from non-linearity of the axes X1 and X2. It should be understood, however, that the present invention is not limited to the use of a four bar linkage, as the feedback means. All that is essential to the invention is that there be some sort of feedback means whereby a certain amount of articulation of the vehicle is translated into a corresponding amount of follow-up movement of the sleeve valve 51. For example, the fluid controller could be physically located right over the pivot pin 17, anchored to the rear bogie 15, but with articulation of the front bogie 13 being translated to the sleeve 51 by means of a flexible shaft or cable, of the type which is now well known and commercially available.

In order to accomplish this objective, and have "full feedback" from the front bogie portion 13 to the sleeve 51, there are certain geometric requirements for the linkage arrangement shown in FIG. 1. The "bar" which represents the fixed distance from the axis of the pivot pin 17 to the axis of the shaft 63 must be the same length as the connecting rod 123. Similarly, the "bar" which represents the fixed distance from the axis of the pivot pin 17 to the axis of the rod end 125 must be the same length as the bell crank 117 (i.e., from the axis of the shaft 63 to the axis of the rod end 121). In other words, the linkage arrangement comprises four "bars" which form a parallelogram. Therefore, if a steering operation occurs, such that the front bogie portion pivots about the pin 17 and forms an articulation angle AA which is equal to 25 degrees, the resulting movement of the connecting rod 123 and bell crank 117 will provide a feedback rotation of 25 degrees to the shaft member 63.

As will be understood by those skilled in the art of fluid controllers, the feedback movement from the front bogie portion 13 reduces the rotational displacement between the spool 49 and sleeve 51, thus reducing the area of the variable flow control orifices A1, A4, and A5. Thus, for any given rotational input by the operator to the steering wheel W, the feedback mechanism will reduce the gain of the steering system (i.e., less total flow for a given steering input), thus making the steering system less aggressive and providing better roadability. As was mentioned earlier, the use of wide angle valving in defining the main variable flow control orifice A1 also serves to accomplish these same purposes.

Although the invention has been illustrated with the fluid controller mounted on the rear bogie 15, and receiving feedback from the front bogie 13, those skilled in the art will understand that the arrangement could be reversed, and the result would be the same. What is essential to the present invention is to provide a feedback to the fluid controller 31 which is "representative" of the amount of articulation. As is noted previously, the arrangement illustrated in FIG. 1 is a parallelogram, thus providing a one-to-one relationship between the amount of articulation and the feedback. However, and within the scope of the present invention, there may be certain vehicle applications in which it is desirable to provide a feedback to the fluid controller which is either less than, or greater than, the amount of articulation, and those skilled in the art of four bar linkages will understand that such modifications in the amount of feedback can be readily achieved simply by adjusting the lengths of the "bars" in the linkage arrangement shown in FIG. 1. For example, if the "bar" between the pivot pin 17 and the rod end 125 were longer than the bell crank 117, a particular pivotal movement of the front bogie 13 would result in fewer rotational degrees of feedback to the shaft 63.

As was noted previously, the members 13S and 15S comprise "frame stops", and are included to limit the extent of articulation of the vehicle. However, it is not desirable to "power into" the frame stops, i.e., with full system pressure still being communicated to the steering cylinders 19 and 21, and with the full flow through the A1, A4, and A5 orifices, even as an adjacent pair of members 13S and 15S are about to engage. Therefore, in accordance with one aspect of the present invention, at approximately 5 degrees before maximum articulation angle is achieved, some form of dampening or power (flow and/or pressure) reduction begins to occur.

Referring now primarily to FIGS. 4, 5 and 7, with further rotation of the spool 49 (so that it moves "downward" in FIG. 7), the pressure ports 99c will begin to communicate with the slots 83, and then finally, the pressure ports 99d will also begin to communicate with the slots 83. When this occurs, the displacement between the spool and sleeve would be about 40 degrees, and in the subject embodiment and by way of example only, the maximum articulation angle between the front bogie 13 and the rear bogie 15 is about 40 degrees. Therefore, in view of the previously-described feedback arrangement from front portion 13 to the sleeve 51, the maximum rotation of the sleeve (assuming a once-to-one feedback ratio) is also 40 degrees. Thus, it would be possible to rotate the steering wheel W and the spool valve 49 to a maximum displacement of 80 degrees (i.e., the maximum sleeve displacement of 40 degrees plus the maximum spool-sleeve displacement of 40 degrees).

One result of rotating the steering wheel W to its maximum 80 degree displacement would be that the A1, A4, and A5 orifices would all be at maximum orifice area as the front and rear bogies approached the maximum articulation angle, and approached engagement of a pair of the frame stops 13S and 15S. In other words, maximum system flow and pressure would be communicated to the steering cylinders 19 and 21 until the frame stops 13S and 15S actually engaged, thus resulting in a substantial and undesirable lateral "jerk" upon engagement.

However, in accordance with one important aspect of the present invention, the "against the stop steering" problem is alleviated. In a normal, prior art spool sleeve steering unit, because of the continuous rotation of the spool and sleeve within the housing, all metering (controlling) of fluid occurs between the spool and sleeve, in response to the relative rotation between the spool and sleeve. It is an important aspect of the present invention that the rotational position of the sleeve 41 is "representative of" the articulation angle between the bogie portions 13 and 15. In other words, and as described previously, the four bar linkage feedback mechanism may be selected such that, for any given amount of articulation, a predetermined amount of rotation of the spool valve 51 occurs.

Figure 8:
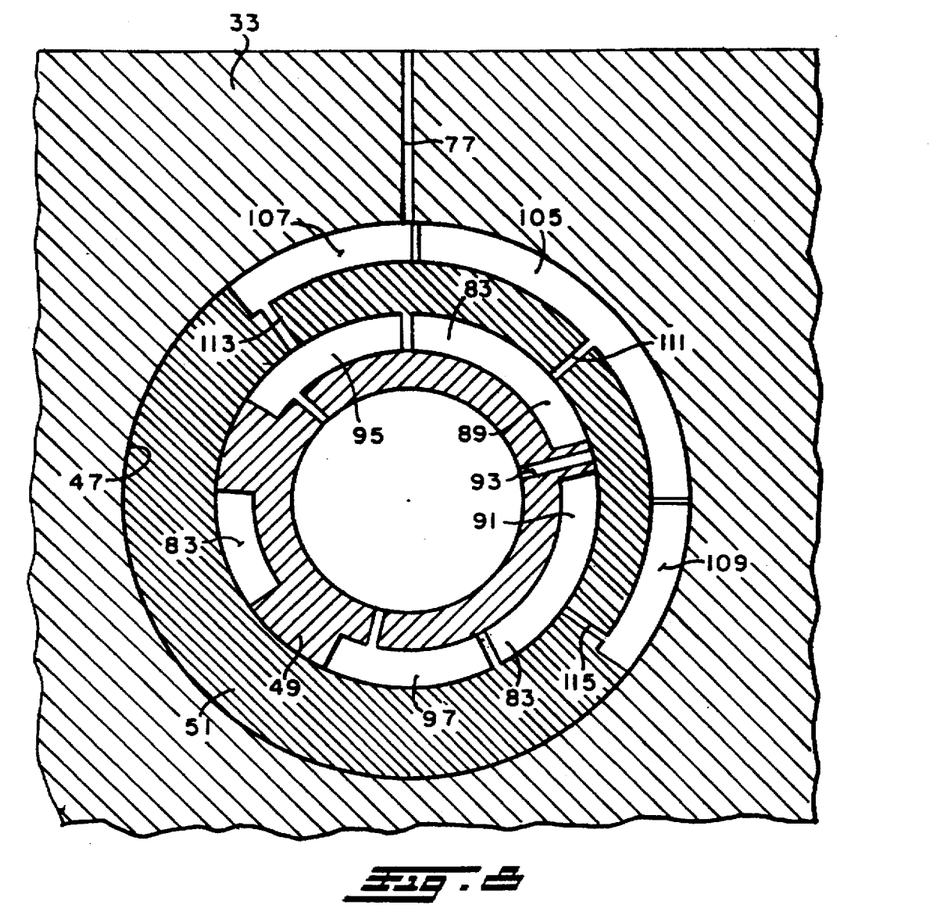
FIG. 8 is an enlarged, fragmentary transverse cross section, taken through the load sensing circuit, illustrating one aspect of the present invention.

In accordance with another aspect of the present invention, this known relationship between the articulation angle and the rotational position of the sleeve 51 is used to prevent the problem of powering into the stops as described above. Referring now primarily to FIG. 8, in conjunction with FIGS. 4 through 7, it should be noted that from the time the spool and sleeve are in the neutral position of FIG. 6, and throughout the full range of a right turn, the circumferentially extending slot 107 is drained to tank by means of the bore 113 and the slot 95 and tank port 85L in the spool. Then as the front and rear bogie portions approach maximum articulation angle (starting perhaps five degrees before maximum), the circumferentially extending slot 105 which, by means of bore 111, picks up a load signal and communicates it back through load sensing port 77 to the pump, passes out of communication with the port 77.

Referring still primarily to FIG. 8, as the sleeve 51 rotates just past the point where the slot 105 no longer communicates with the load sensing port 77, the port 77 then begins to communicate with the slot 107 which, as was noted previously, is at tank pressure. Therefore, and by way of example only, the pump standby pressure will drop from about 150 psi to about 25 psi. As is well known to those skilled in the hydraulics art, the pump standby pressure correlates to the pressure drop across the main variable flow control orifice A1, and because flow is proportional to the square root of the pressure drop across the A1 orifice, the flow through the controller 31 (and thus, the flow to the cylinders) will drop to about one-third of "normal" as the load sensing port 77 stops communicating with the slot 105 and begins communicating with the slot 107. As a result, during the last several degrees of articulation before the frame stops engage, the flow to the steering cylinders will substantially decrease, thus effectively "cushioning" or "feathering" the engagement of the frame stops, rather than powering into the frame stops at full system flow.

Although the present invention has been described, with reference to the preferred embodiment, as solving the "against the stops steering" problem by metering the load sensing signal, those skilled in the art will understand that the invention is not so limited, and other parts of the main flow path could be controlled or metered or bled to tank as a way of reducing system pressure and/or flow prior to engaging the stops. What is significant in the embodiment shown in FIG. 8 is the "cascaded" (series) metering, whereby normal steering control is accomplished between the spool and sleeve, but then either system pressure or flow (or both) are cushioned or reduced at one or more metering points between the sleeve and the housing, such that this metering occurs in response to sleeve position which, in the subject embodiment, is representative of articulation angle.

Figure 9:
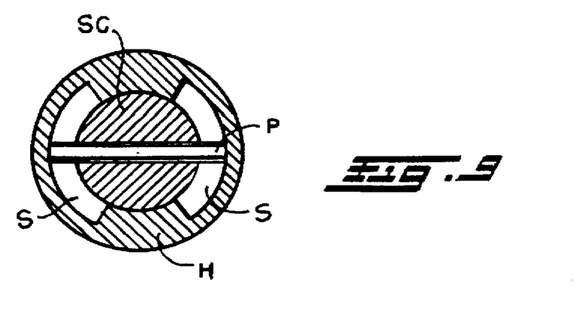
FIG. 9 is a transverse cross section taken through the steering column, shown schematically in FIG. 2, illustrating another aspect of the invention.

Within the scope of the present invention, it would be possible to prevent the against the stop steering problem in another manner. Assume again that the maximum articulation angle for the vehicle would again be 40 degrees. However, as was mentioned in BACKGROUND OF THE DISCLOSURE, in many vehicle applications it would be desirable to put various controls (such as for the transmission) on the steering wheel, and limit steering wheel rotation. Therefore, in the embodiment being described, a mechanical stop, such as a pin P, is provided to limit the rotation of the steering wheel W, or the spool 49, to no more than 60 degrees displacement relative to the housing 33. As may best be seen in FIG. 9, the pin P passes through the steering column SC, as it rotates within a column housing H. the housing defines a pair of internal arcuate slots S, which each extends about 120 degrees. With the wheel W centered (corresponding to the position shown in FIG. 9), the ends of the pin P are "centered" in the slots S. Therefore, in this embodiment, as the steering wheel W is rotated from the neutral position, and the spool-sleeve displacement increases toward its maximum (still assumed to be 40 degrees), the flow to the steering cylinders will progressively increase to the maximum flow rate. However, once the steering wheel W reaches 60 degrees of rotation, it (or the column SC or the spool 49) will engage a stop, and thereafter, the flow to the steering cylinder will result in further articulation of the bogie portions, but the resulting follow up movement to the sleeve 51 will begin to reduce the spool-sleeve displacement from its 40 degree maximum In this embodiment, and by way of example only, when the articulation is approaching the 40 degree maximum, with the spool having been limited to 60 degree rotation, the spool-sleeve displacement would be in the process of decreasing to about 20 degrees. In typical spool-sleeve architecture, when the displacement between the spool and sleeve is at about half of maximum, the flow through the main flow path is typically only about half of maximum flow, or perhaps even less. Thus, in accordance with another aspect of the present invention, the against the stop steering problems may be solved by limiting the displacement of the spool 49, and then using the follow up movement of the sleeve 51, as it approaches its maximum, to decrease system flow and/or pressure to the steering cylinders.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

We claim:

1. A steering system for an articulated vehicle including a rear bogie portion defining a first axis and a front bogie portion defining a second axis, said first and second axes defining an articulation angle; fluid pressure operated means having one portion connected to said rear bogie portion and another portion connected to said front bogie portion, and operable, in response to the presence of pressurized fluid, to change said articulation angle; said steering system comprising a source of pressurized fluid and a steering control valve assembly including a housing defining a fluid inlet port in fluid communication with said source of pressurized fluid, and a first control fluid port in fluid communication with said fluid pressure operated means; said steering control valve assembly further comprising a primary valve member adapted to receive steering input, and a follow-up valve member disposed between said primary valve member and said housing; said primary and follow-up valve members cooperating to define an operating position, relatively displaced from a neutral position, in which said valve members define a main flow path providing fluid communication between said fluid inlet port and said first control fluid port; characterized by:

(a) said housing of said steering control valve assembly being fixed relative to one of said rear and front bogie portions; and (b) feedback means operable to transmit a motion, representative of a change in said articulation angle, as a follow-up movement to said follow-up valve member.

2. A steering system as claimed in claim 1, characterized by said primary valve member comprising a rotatable valve member, and said follow-up valve member comprising a relatively rotatable follow-up valve member, and said operating position of said valve members comprising said primary and said follow-up valve members being relatively rotationally displaced.

3. A steering system as claimed in claim 1, characterized by said fluid pressure operated means comprises a hydraulic cylinder defining head end and rod end fluid pressure chambers, said head end fluid pressure chamber being in fluid communication with said first control fluid port.

4. A steering system as claimed in claim 3, characterized by said housing of said steering control valve assembly defining a second control fluid port and a return port, said main fluid path providing fluid communication between said second control fluid port and said return port, said rod end fluid pressure chamber of said cylinder being in fluid communication with said second control fluid port.

5. A steering system as claimed in claim 1, characterized by said housing of said steering control valve assembly being fixed relative to said rear bogie portion, and said feedback mean providing a mechanical connection between said front bogie portion and said follow-up valve member.

6. A steering system as claimed in claim 5, characterized by said feedback means comprising a shaft assembly including at least one connecting rod disposed between said front bogie portion and said follow-up valve member.

7. A steering system as claimed in claim 1, characterized by said articulated vehicle having a predetermined maximum articulation angle, and said steering control valve assembly including cushioning means operable to reduce the flow of pressurized fluid to said first control fluid port during steering, as said vehicle articulation angle approaches said predetermined maximum angle.

8. A steering system as claimed in claim 7, characterized by said steering control valve assembly including a load sensing port adapted to transmit a steering load signal to a displacement control of said source of pressurized fluid to vary the fluid delivery of said source in response to variations in said load signal, said housing and said follow-up valve member cooperating to define a metering location operable to communicate said steering load signal to a source of relatively low fluid pressure, as said vehicle articulation angle approaches said predetermined maximum angle.

9. A steering system as claimed in claim 1, characterized by said primary and follow-up valve members comprising wide angle valving, whereby said valve members define a main variable flow control orifice, said main orifice being open over a range of relative displacement of said valve members of at least about thirty degrees.

10. A controller for use in a vehicle steering system of the type comprising a source of pressurized fluid, a fluid pressure operated device operable to effect steering of the vehicle, and a portion of the vehicle steering system having a movement, during steering, corresponding to the magnitude of steering; said controller comprising housing means defining a fluid inlet port adapted for fluid communication with said source, and a first control fluid port adapted for fluid communication with said fluid pressure operated device; valve means disposed in said housing means and comprising a primary, rotatable valve member, and a cooperating, relatively rotatable follow-up valve member, said primary and follow-up valve members defining a neutral position, and a first operating position in which said primary valve member is rotatably displaced from said neutral position, relative to said follow-up valve member, in a first direction; said housing means and said valve members cooperating to define a first main fluid path providing fluid communication from said inlet port to said first control fluid port when said valve members are in said first operating position; characterized by:

(a) follow-up means operably associated with said follow-up valve member to transmit rotary follow-up movement thereto in response to a follow-up input motion received from said portion of the vehicle steering system having movement during steering.

11. A controller as claimed in claim 10, characterized by said follow-up means being adapted to receive said rotary follow-up input motion from a linkage means attached to said portion of the vehicle steering system having movement during steering.

12. A controller as claimed in claim 10, characterized by said linkage means comprises a four bar linkage arrangement.

13. A controller as claimed in claim 10, characterized by said follow-up means comprising a first rotatable follow-up shaft rotatably supported by said housing means, and a second rotatable follow-up shaft at least partly disposed within said primary valve member, and operable to transmit follow-up motion from said first follow-up shaft to said follow-up valve member.

14. A controller as claimed in claim 12, characterized by being adapted for use on an articulated vehicle including a front bogie portion and a rear bogie portion, said controller housing means being adapted to be fixed relative to one of said bogie portions, and said portion of the vehicle steering system having movement during steering comprising the other of said bogie portions.

15. A controller for use in a vehicle steering system of the type comprising a source of pressurized fluid, a fluid pressure operated device operable to effect steering of the vehicle, and a portion of the vehicle steering system having a movement, during steering, corresponding to the magnitude of steering; said controller comprising housing means defining a fluid inlet port adapted for fluid communication with said source, and a first control fluid port adapted for fluid communication with said fluid pressure operated device; valve means disposed in said housing means and comprising a primary, rotatable valve member, and a cooperating, relatively rotatable follow-up valve member, said primary and follow-up valve members defining a neutral position, and a first operating position in which said primary valve member is rotatably displaced from said neutral position, relative to said follow-up valve member, in a first direction; said housing means and said valve members cooperating to define a main fluid path providing fluid communication from said inlet port to said first control fluid port when said valve members are in said first operating position, flow through said main fluid path being generally proportional to the rotational displacement of said primary and follow-up valve members; said portion of the vehicle steering system having movement defining a maximum displaced position; characterized by:

(a) follow-up means operably associated with said follow-up valve member to transmit rotary follow-up movement thereto in response to a follow-up input motion received from said portion of the vehicle steering system having movement during steering, said follow-up valve member having a maximum rotational displacement corresponding to said maximum displaced position of said portion of the vehicle steering system having movement;

(b) means operable to limit rotation of said primary valve member to a predetermined maximum rotational displacement at least equal to said maximum rotational displacement of said follow-up valve member; and (c) said follow-up means being operable to decrease fluid flow through said main fluid path after said primary valve member reaches its maximum rotational displacement, and as said portion of the vehicle steering system having movement approaches said maximum displaced position.

16. A controller as claimed in claim 15, characterized by said maximum rotational displacement of said primary valve member being in the range of about sixty degrees, and said maximum rotational displacement of said follow-up valve member being in the range of about forty degrees.

* * * * *